US010256922B2

(12) United States Patent
Rowell et al.

(10) Patent No.: US 10,256,922 B2
(45) Date of Patent: Apr. 9, 2019

(54) CALIBRATION METHOD AND SYSTEM

(71) Applicant: Rohde & Schwarz GmbH & Co. KG, Munich (DE)

(72) Inventors: Corbett Rowell, Munich (DE); Adam Tankielun, Ottobrunn (DE); Sebastian Schmitz, Planegg (DE); Andreas Lechner, Rosenheim (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/669,217

(22) Filed: Aug. 4, 2017

(65) Prior Publication Data

US 2019/0044623 A1    Feb. 7, 2019

(51) Int. Cl.
| | |
|---|---|
| *H04B 17/12* | (2015.01) |
| *H04B 17/21* | (2015.01) |
| *H04B 17/13* | (2015.01) |
| *H01Q 3/34* | (2006.01) |
| *H04B 1/40* | (2015.01) |
| *H01Q 3/28* | (2006.01) |

(52) U.S. Cl.
CPC ............... *H04B 17/12* (2015.01); *H01Q 3/28* (2013.01); *H01Q 3/34* (2013.01); *H04B 1/40* (2013.01); *H04B 17/13* (2015.01); *H04B 17/21* (2015.01)

(58) Field of Classification Search
None
See application file for complete search history.

(56) References Cited

U.S. PATENT DOCUMENTS

| | | | | |
|---|---|---|---|---|
| 5,861,843 | A * | 1/1999 | Sorace | H01Q 3/267 342/174 |
| 9,948,408 | B1* | 4/2018 | Gomadam | H04B 17/12 |
| 2002/0128007 | A1* | 9/2002 | Miyatani | H01Q 3/267 455/423 |
| 2012/0146840 | A1* | 6/2012 | Ookawa | G01S 7/4004 342/165 |
| 2015/0325926 | A1* | 11/2015 | Topak | H01Q 21/0006 342/371 |

* cited by examiner

*Primary Examiner* — Mohammed Rachedine
(74) *Attorney, Agent, or Firm* — Christensen O'Connor Johnson Kindness PLLC

(57) ABSTRACT

A calibration method for calibrating a device under test with regard to at least one of phase and amplitude characteristics is described, with providing a device under test. Providing a measurement unit that has at least one measurement antenna unit configured to measure the radiated power of the device under test in the far-field region of the device under test. Turning on at least two antenna elements at the same time with at least one of a steering phase and a steering amplitude such that a peak beam, a null or a side lobe of the radiation pattern generated is directed towards the measurement antenna unit. Adjusting the phase or amplitude of at least one antenna element while the at least one other antenna element remaining stable. Recording the adjusted phase value or the adjusted amplitude value. Saving the setup corresponding to the highest measured gain or the lowest measured gain. Repeating the adjusting and recording steps for at least one other antenna element until a threshold value for the measured gain is reached.

13 Claims, 2 Drawing Sheets

CALIBRATION METHOD AND SYSTEM

FIELD OF THE DISCLOSURE

Embodiments of the present disclosure relate generally to a calibration method for calibrating a device under test as well as a system for the calibration of at least one of phase and amplitude of the device under test.

BACKGROUND

In modern telecommunication devices such as mobile phones, antenna arrays are commonly used for receiving and/or transmitting electromagnetic waves. An antenna array has several individual antenna elements that are connected with each other such that they work as a single antenna. However, these antenna arrays used in the telecommunication devices have to be calibrated in production lines in order to ensure that the telecommunication devices work properly.

So far, the telecommunication devices have been calibrated by using near field scanning over a surface or a single near field point with very precise positioning system and tightly synchronized measurement system. Afterwards, the near field characteristics have to be converted into far field characteristics using a Fourier transform, for instance.

However, the calibration processes used in the state of the art are very complex, time consuming and expensive.

SUMMARY

Accordingly, there is a need for a possibility to calibrate a telecommunication device being a device under test during the calibration process in a fast and cost-efficient manner.

Embodiments of the present disclosure provide a calibration method for calibrating a device under test with regard to at least one of phase and amplitude characteristics, with the following steps:

providing a device under test having several transceivers and antenna elements allocated to the transceivers;

providing a measurement unit having at least one measurement antenna unit configured to measure the radiated power of the device under test in the far-field region of the device under test;

turning on at least two antenna elements at the same time with at least one of a steering phase and a steering amplitude such that a peak beam, a null or a side lobe of the radiation pattern generated is directed towards the measurement antenna unit;

adjusting the phase or amplitude of at least one antenna element while the at least one other antenna element remaining stable;

recording the adjusted phase value or the adjusted amplitude value that causes highest measured gain or lowest measured gain of the radiated power;

saving the setup corresponding to the highest measured gain or the lowest measured gain;

repeating the adjusting and recording steps for at least one other antenna element until a threshold value for the measured gain is reached.

Accordingly, a fast calibration process is obtained that also generates lower costs with respect to the methods known in the state of the art. Moreover, the repeatability is higher than the one of the calibration processes known in the state of the art. The measurement antenna unit may be located such that a side lobe or a null of the radiation pattern generated by the device under test is directed towards the measurement antenna unit. The measurement antenna unit is located in a position that is deemed (under ideal conditions relating to a model) to allocate to a null provided between two neighbored side lobes. However, the expected radiation pattern differs from the real one such that a portion of the side lobe is probably directed towards the measurement antenna unit. Alternatively or supplementarily, the radiation pattern is formed by beam forming and/or beam steering properties, in particular the steering phase and/or the steering amplitude applied, such that it is ensured that a side lobe or a null of the radiation pattern is directed towards the measurement antenna unit. Then, the phase or amplitude of at least one individual antenna element is adjusted for calibration purposes in order to evaluate the radiated power of the device under test that is measured by the measurement unit. The corresponding setup is saved appropriately, in particular the adjusted phase value or the adjusted amplitude value causing the lowest measured value for the side lobe or the null being evaluated appropriately. Generally, the lowest measured value may correspond to the lowest measured gain. These steps are repeated for further antenna elements until a threshold value of the gain is reached, namely a lower threshold value.

Alternatively, the measurement antenna unit may be located such that a peak beam of the radiation pattern generated by the device under test is directed towards the measurement antenna unit. Then, the phase or amplitude of at least one individual antenna element is adjusted for calibration purposes in order to evaluate the radiated power of the device under test that is measured by the measurement unit. The corresponding setup is saved appropriately, in particular the adjusted phase value or the adjusted amplitude value causing the highest measured gain for the peak beam appropriately. These steps are also repeated for further antenna elements until a threshold value of the gain is reached, namely an upper threshold value.

Generally, the phase calibration and the amplitude calibration are performed separately with respect to each other. During the amplitude calibration applied for the side lobes, the amplitude is weighted such that the side lobes are suppressed. This is typically done with a triangular tapering of the amplitude in order to obtain the ideal amplitude profile for the radiation pattern. In fact, a simple triangular taper reduces the side lobes significantly wherein the first side lobe is still the strongest one.

According to an aspect, the recorded adjusted value, and in some embodiments the adjusted phase value or the adjusted amplitude value, and the predefined steering phase or rather the predefined steering amplitude are subtracted from each other in order to obtain appropriate calibration coefficients for the phase and/or amplitude. Thus, the highest measured gain as well as the lowest measured gain are used to obtain the corresponding calibration coefficients. For the calibration coefficients, the original steering phase or rather steering amplitude values are taken into account appropriately.

According to another aspect, the phase or amplitude of a group of antenna elements is adjusted simultaneously. Thus, the phase or amplitude is not only adjusted for a single antenna element, but for more than one wherein the other antenna elements remain stable. Hence, two or more antenna elements can be adjusted with regard to phase or amplitude simultaneously.

Moreover, the phase calibration steps are repeated for additional beam directions in order to obtain a global maximum or a global minimum. The calibration steps comprise the steps with regard to changing the phase of at least one antenna element, recording the adjusted phase value as well as saving the corresponding setup appropriately. Due to the different beam directions used for the calibration process, it is ensured that the global maximum or the global minimum can be provided in an efficient manner.

According to another aspect, the amplitude calibration steps are repeated for additional side lobes of the radiation pattern in order to obtain a global minimum. The amplitude calibration steps comprise the steps with regard to changing the amplitude, recording the adjusted amplitude value and saving the corresponding setup. Hence, it is also ensured that the global minimum is obtained as different side lobes of the whole radiation pattern generated by the antenna array of the device under test are taken into account.

According to an embodiment, the calibration steps are repeated at different temperatures. As an amplifier unit, in particular its characteristics, depends on the temperature, measurement errors can be avoided or at least minimized since the calibration steps are performed at different temperatures in order to verify the temperature dependency of the amplifier unit. In fact, this temperature dependency can be compensated appropriately.

According to another embodiment, the phase is shifted and nulls of the radiation pattern are measured. Thus, the influence of the phase on the nulls of the radiation pattern can be investigated appropriately.

Moreover, the amplitude may be shifted and side lobes of the radiation pattern may be measured. Thus, the influence of the amplitude on the side lobes of the radiation pattern can be investigated in a similar manner.

According to another embodiment, the phase or amplitude may be adjusted such that the device under test has a main lobe directing towards the measurement antenna unit. Hence, the peak beam (main lobe) can be directed towards the measurement antenna unit for calibration purposes appropriately. This results in a faster convergence of the calibration process.

Moreover, the phase may be calibrated initially such that the amplitude calibration takes place once the phase is calibrated. Hence, the phase calibration is performed prior to the amplitude calibration such that the stability of the radiation pattern, in particular the stability of the side lobes and nulls, is ensured during the amplitude calibration since the phase calibration has already been done.

For instance, the phase calibration may be performed by adjusting the phase value(s) such that the peak beam (main lobe) is directed towards the measurement antenna unit and the highest measured gain is recorded appropriately as mentioned above. The phase calibration is finished once an upper threshold value for the measured gain is reached. Then, the amplitude calibration may take place while taking a side lobe or a null of the radiation pattern into account and adjusting the amplitude value(s) such that lowest measured gain of the radiated power is obtained, in particular wherein several antenna elements are adjusted appropriately until a lower threshold value for the measured gain is reached.

Furthermore, embodiments of the present disclosure provide a system for the calibration of at least one of phase and amplitude of a device under test, comprising a control unit, a measurement unit and a measurement antenna unit, the measurement antenna unit being connected to said measurement unit, said control unit having a control interface to be connected with the device under test, the system being configured to perform a method as described above. The advantages mentioned above also apply to the system in a similar manner.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawing, wherein

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
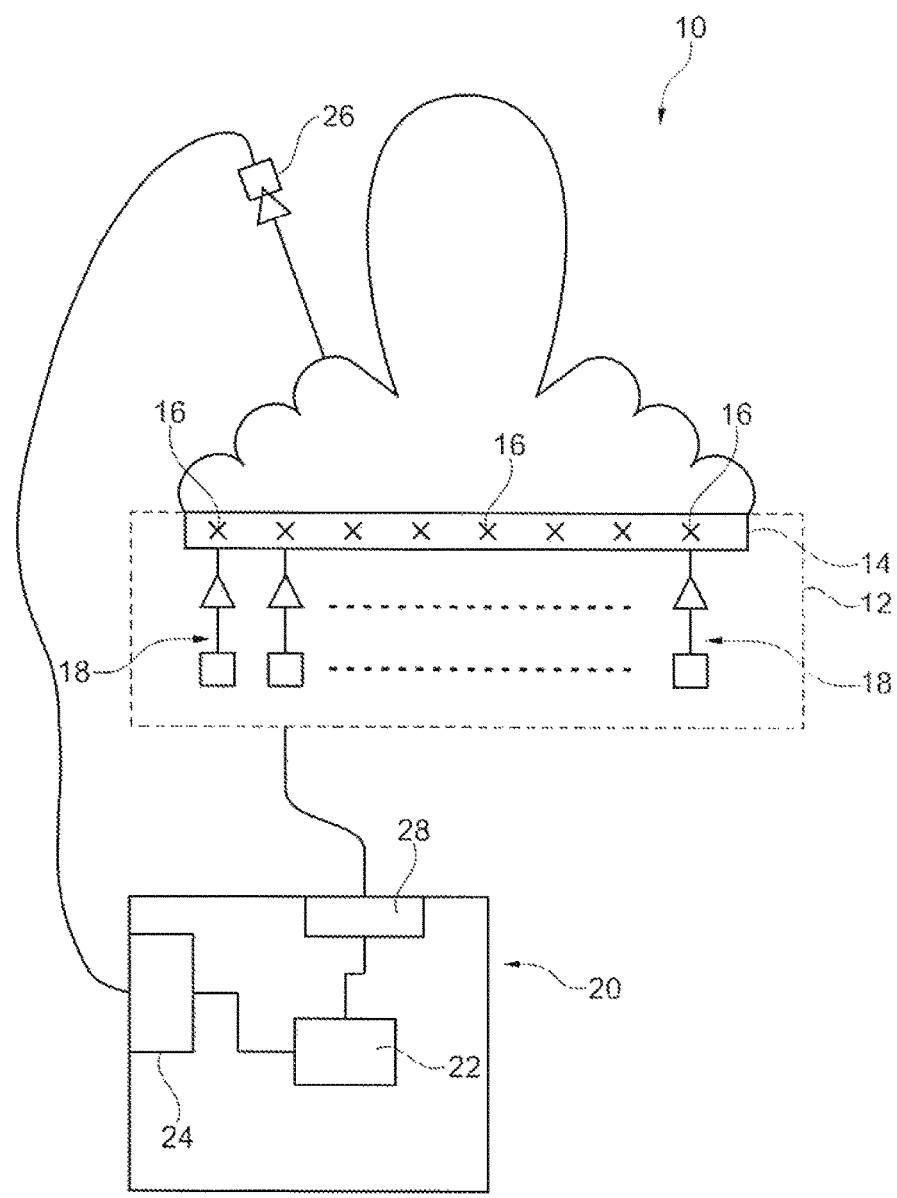
FIG. 1 shows a schematic overview of one representative embodiment of a system according to the disclosure.

In FIG. 1, a system 10 for the calibration of at least one of phase and amplitude of a device under test 12 is shown, in particular the radiation pattern generated by the device under test 12. The device under test 12 comprises an antenna array 14 for transmitting and/or receiving electromagnetic waves. The antenna array 14 has several individual antenna elements 16 that are allocated to transceivers 18.

The system 10 further comprises a measurement and analyzing device 20 that comprises inter alia a control unit 22, a measurement unit 24 and a measurement antenna unit 26 that is connected to the measurement unit 24. The measurement unit 24 is also connected to the control unit 22 such that the measured signals are forwarded to the control unit 22 for processing the measured signals appropriately. The measurement unit 26 may comprise one or more antenna elements.

The control unit 22 has a control interface 28 that is connected to the device under test 12 in order to control the device under test 12 appropriately, in particular the active antenna array 14.

Figure 2:
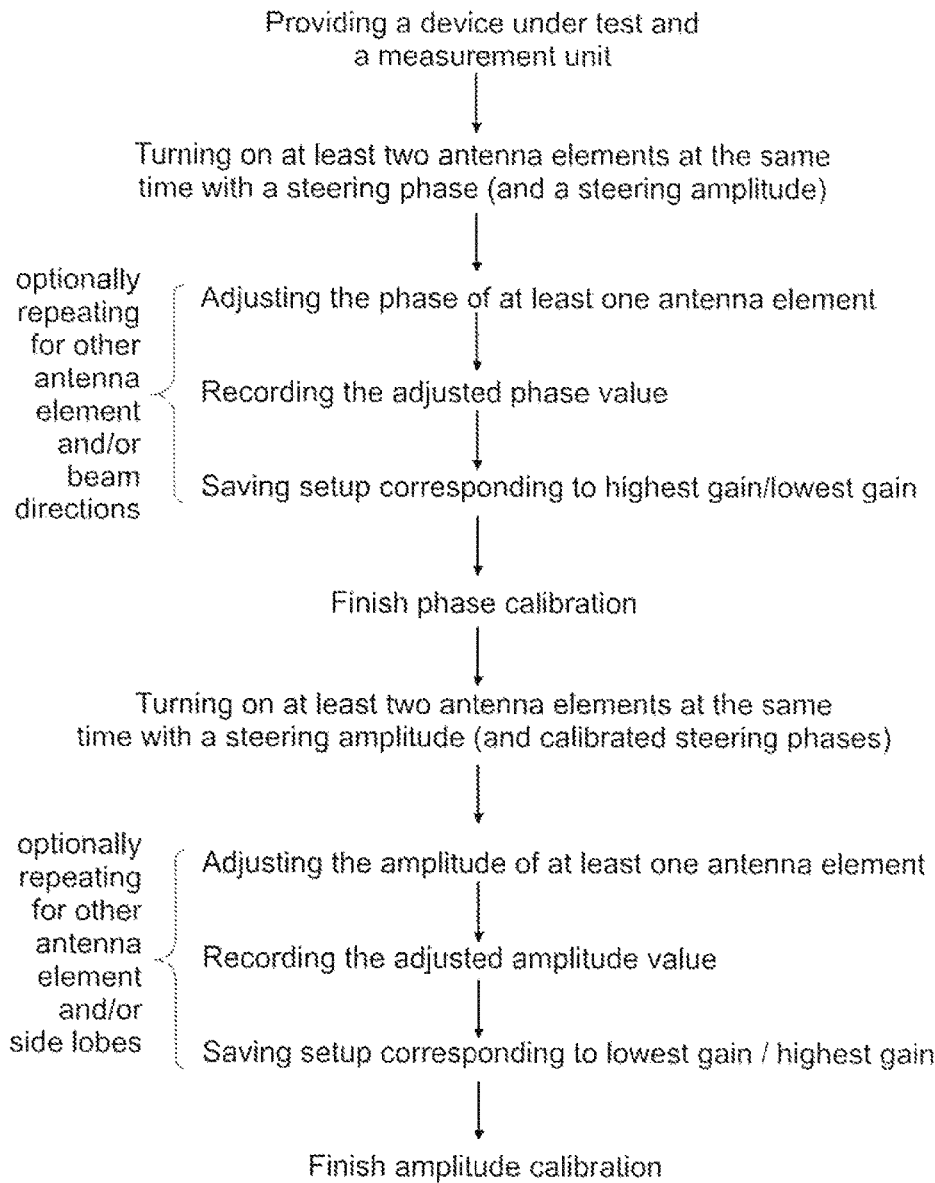
FIG. 2 shows a flowchart representing one embodiment of the method according to the disclosure.

The whole system 10 is configured to perform a method as illustrated by the flow chart in FIG. 2 that will be described hereinafter.

The system 10 is able to perform a phase calibration of the device under test 12, in particular its antenna array 14. Therefore, the individual antenna elements 16 of the antenna array 14 are controlled such that at least two individual antenna elements 16 are switched on having predefined steering phase and/or steering amplitude values used for generating radiation signals that can be measured by the measurement antenna unit 26.

The measurement antenna unit 26 is positioned with respect to the device under test 12, in particular its antenna array 14, such that a peak beam, a null or a side lobe of the radiation pattern generated by the device under test 12 is directed towards the measurement antenna unit 26. In FIG. 1, the first side lobe is directed towards the measurement antenna unit 26.

Alternatively or supplementarily, the individual antenna elements 16 are controlled such that a peak beam, a null or a side lobe of the radiation pattern generated is directed towards the measurement antenna unit 26.

Hereinafter, a calibration process is described according to which the phase calibration is done initially wherein the amplitude calibration takes place afterwards.

Therefore, the phase of at least one of the individual antenna elements 16 is adjusted wherein the other antenna elements 16 are still switched on having a stable phase, namely the predefined phase value applied at the beginning. The adjusted phase value is recorded via the measurement antenna unit 26 and the radiated power, in particular the corresponding gain, is analyzed by the measurement and analyzing device 20 such that the lowest measured gain is detected that corresponds to the lowest measured value while referring to a side lobe or a null of the radiation pattern. Hence, this value relates to the null (or side lobe) measured by the measurement antenna unit 26.

The setup, in particular the adjusted phase value, corresponding to the lowest measured gain (radiated power) is saved. Thus, the setup mainly corresponds to the phase value set for generating the appropriate signal relating to the lowest measured gain at the null or side lobe of the radiation pattern.

Afterwards, the adjusting and recording steps are repeated for at least one other antenna element 16 until a threshold value for the radiated power of the null or side lobe is reached. Hence, the threshold value may correspond to a lower threshold value. The threshold value may be predefined wherein the threshold value defines a confidence limit.

Once the setups for the individual antenna elements 16 of the antenna array 14 ensure that the predefined threshold value is reached, the calibration of the phase has been finished.

Alternatively, the phase calibration may take place while taking the peak beam into account. Hence, the phase value(s) of the at least one single antenna element 16 is adjusted until highest measured gain is obtained. The appropriate setup is saved accordingly.

As mentioned above, this (the adjusting and recording steps) is repeated for at least one other individual antenna element 16 until a threshold value for the measured gain is reached, namely an upper threshold value being predefined.

Then, the phase calibration may be repeated for additional beam directions in order to obtain a global minimum or a global maximum of the radiation pattern generated.

Furthermore, the calibration steps may be repeated at different temperatures in order to compensate for a temperature dependency of an amplifier unit.

After the phase has been calibrated appropriately, the amplitude calibration takes place wherein once again at least two individual antenna elements 16 of the antenna array 14 are switched on.

The individual antenna elements 16 are controlled such that predefined amplitude value(s) for generating the signals are used as well as the phase values calibrated previously. This ensures that the side lobes and nulls of the radiation pattern are stable.

Then, the measurement antenna unit 26 may be positioned with respect to the device under test 12, in particular its antenna array 14, such that a null or a side lobe of the radiation pattern generated by the device under test 12 is directed towards the measurement antenna unit 26 as shown in FIG. 1.

The amplitude of at least one antenna element 16 is adjusted while the other antenna elements 16 remain stable. In a similar manner with regard to the phase calibration, the adjusted amplitude value is recorded that causes a lowest measured gain of the radiated power. The appropriate setup corresponding to this lowest measured value is saved. When performing the amplitude calibration with regard to the side lobes, the amplitude of the antenna array, namely the ones of the individual antenna elements 16, is weighted such that the side lobes of the radiation pattern are suppressed which is typically done with a triangular tapering of the amplitude.

Then, the adjusting and recording steps are repeated for at least one other antenna element 16 until a threshold value of the radiated power being predefined is reached, namely a lower threshold value.

This ensures that the intended characteristics of the radiation pattern of the device under test 12 are obtained. Hence, the device under test 12, in particular its antenna array 14, is calibrated appropriately.

Optionally, the amplitude calibration steps are repeated for additional side lobes of the radiation pattern in order to obtain a global minimum. Hence, the other side lobes of the radiation pattern generated by the device under test 12 are also taken into account.

Alternatively, the amplitude calibration may take place while referring to the peak beam (main lobe) that is directed towards the measurement antenna unit 26. Thus, the amplitude value is adjusted such that highest measured gain is obtained wherein the corresponding setup is saved appropriately. As mentioned above, these steps are repeated for at least one other individual antenna elements 16 until a threshold value for the measured gain is reached, namely an upper threshold value.

Furthermore, the calibration steps with regard to the amplitude may also be repeated at different temperatures due to the temperature dependency of the amplifier unit.

Generally, the phase and/or amplitude may be adjusted for a group of antenna elements 16 simultaneously instead of a single antenna element 16.

Moreover, the obtained adjusted values with regard to phase and/or amplitude, namely the recorded ones, are taken into consideration with the original values used at the beginning in order to obtain appropriate calibration coefficients. Accordingly, the differences of the recorded adjusted phase and amplitude values and the predefined initial ones are used for obtaining the calibration coefficients.

Moreover, the amplitude is shifted and the side lobes of the radiation pattern are measured. Hence, the influence of the amplitude with regard to the side lobes can be evaluated appropriately.

In a similar manner, the phase is shifted and the nulls of the radiation pattern are measured in order to evaluate the radiation pattern with regard to its nulls.

After the calibration process, the phase and/or amplitude may be adjusted such that the device under test 12 has a peak beam directing towards the measurement antenna unit 26. This can be done as a verifying step at the end of the corresponding calibration process in order to verify the calibration process.

Accordingly, a fast and cost-efficient method for calibrating a device under test 12 is provided that can be applied in production lines.

The control unit 22 described above may include, in some embodiments, logic to control, for example, the active antenna array 14, the individual antenna elements 16, etc., process measured signals received from the measurement unit 24, and/or perform one or more methodologies or technologies carried out by one of, some of, or all of the embodiments described herein. This logic of the control unit 22 can be carried out in either hardware or software, or a combination of hardware and software. In some embodiments, the control unit 22 includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, the control unit 22 includes a microprocessor and a memory storing logic modules and/or instructions. In an embodiment, the control unit 22 includes one or more ASICs having a plurality of predefined logic components. In an embodiment, the control unit 22 includes one or more FPGA having a plurality of programmable logic components. In an embodiment, the control unit 22 includes hardware circuit implementations (e.g., implementations in analog circuitry, implementations in digital circuitry, and the like, and combinations thereof). In an embodiment, the control unit 22 includes combinations of circuits and computer program products having software or firmware instructions stored on one or more computer readable memories that work together to cause a device to perform one or more methodologies or technologies described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A calibration method for calibrating a device under test with regard to at least one of phase or amplitude characteristics, with the following steps:
    providing a device under test having several transceivers and antenna elements allocated to said transceivers;
    providing a measurement unit having at least one measurement antenna unit configured to measure the radiated power of said device under test in the far-field region of said device under test;
    turning on at least two antenna elements at the same time with at least one of a steering phase and a steering amplitude in the beginning such that a null or a side lobe of the radiation pattern generated is directed towards said measurement antenna unit so that the measurement antenna unit is located in a position that is deemed, under ideal conditions relating to a model, to allocate to a null provided between two neighbored side lobes or a side lobe;
    adjusting the phase or amplitude of at least one antenna element while the at least one other antenna element remaining stable;
    recording the adjusted phase value or the adjusted amplitude value that causes lowest measured gain of the radiated power;
    saving the setup corresponding to said lowest measured gain; and
    repeating the adjusting and recording steps for at least one other antenna element until a threshold value for said measured gain is reached.

2. The calibration method according to claim 1, wherein the predefined steering phase or the predefined steering amplitude and said recorded adjusted value are subtracted from each other in order to obtain appropriate calibration coefficients.

3. The calibration method according to claim 1, wherein the phase or amplitude of a group of antenna elements is adjusted simultaneously.

4. The calibration method according to claim 1, wherein said phase calibration steps are repeated for additional beam directions in order to obtain a global maximum or a global minimum.

5. The calibration method according to claim 1, wherein said amplitude calibration steps are repeated for additional side lobes of the radiation pattern in order to obtain a global minimum.

6. The calibration method according to claim 1, wherein the calibration steps are repeated at different temperatures.

7. The calibration method according to claim 1, wherein the phase is shifted and nulls of said radiation pattern are measured.

8. The calibration method according to claim 1, wherein the amplitude is shifted and side lobes of said radiation pattern are measured.

9. The calibration method according to claim 1, wherein the phase or amplitude is adjusted such that said device under test has a main lobe directing towards said measurement antenna unit.

10. The calibration method according to claim 1, wherein the phase is calibrated initially such that the amplitude calibration takes place once the phase is calibrated.

11. A calibration method for calibrating a device under test with regard to phase and amplitude characteristics, with the following steps:
    providing a device under test having several transceivers and antenna elements allocated to said transceivers;
    providing a measurement unit having at least one measurement antenna unit configured to measure the radiated power of said device under test in the far-field region of said device under test,
    the calibration method comprising the following steps for calibrating a device under test with regard to phase characteristics:
    turning on at least two antenna elements at the same time with a steering phase such that a peak beam, a null or a side lobe of the radiation pattern generated is directed towards said measurement antenna unit;
    adjusting the phase of at least one antenna element while the at least one other antenna element remaining stable;
    recording the adjusted phase value that causes highest measured gain or lowest measured gain of the radiated power;
    saving the setup corresponding to said highest measured gain or said lowest measured gain; and
    repeating the adjusting and recording steps for at least one other antenna element until a threshold value for said measured gain is reached,
    and the calibration method comprising the following steps for calibrating the device under test with regard to amplitude characteristics:
    turning on at least two antenna elements at the same time with a steering amplitude such that a peak beam, a null or a side lobe of the radiation pattern generated is directed towards said measurement antenna unit;
    adjusting the amplitude of at least one antenna element while the at least one other antenna element remaining stable;

recording the adjusted amplitude value that causes highest measured gain or lowest measured gain of the radiated power;

saving the setup corresponding to said highest measured gain or said lowest measured gain; and repeating the adjusting and recording steps for at least one other antenna element until a threshold value for said measured gain is reached.

12. A system for the calibration of at least one of phase and amplitude of a device under test, comprising a control unit, a measurement unit and a measurement antenna unit, said measurement antenna unit being connected to said measurement unit, said control unit having a control interface to be connected with said device under test, said system being configured to perform a method according to claim 11.

13. A calibration method for calibrating a device under test with regard to at least one of phase or amplitude characteristics, with the following steps:

providing a device under test having several transceivers and antenna elements allocated to said transceivers;

providing a measurement unit having at least one measurement antenna unit configured to measure the radiated power of said device under test in the far-field region of said device under test;

turning on at least two antenna elements at the same time with at least one of a steering phase and a steering amplitude in the beginning such that a peak beam of the radiation pattern generated is directed towards said measurement antenna unit;

adjusting the phase or amplitude of at least one antenna element while the at least one other antenna element remaining stable;

recording the adjusted phase value or the adjusted amplitude value that causes highest measured gain of the radiated power;

saving the setup corresponding to said highest measured gain; and repeating the adjusting and recording steps for at least one other antenna element until a threshold value for said measured gain is reached.

\* \* \* \* \*